United States Patent [19]

Kalberer

[11] Patent Number: 4,581,842
[45] Date of Patent: Apr. 15, 1986

[54] TROLLING DIVER

[76] Inventor: Karl H. Kalberer, 85 Somerset Dr., Santa Rosa, Calif. 95401

[21] Appl. No.: 705,477

[22] Filed: Feb. 26, 1985

[51] Int. Cl.⁴ .................................................. A01K 91/06
[52] U.S. Cl. .................................................. 43/43.13
[58] Field of Search .................... 43/43.13, 42.22, 27.4

[56] References Cited

U.S. PATENT DOCUMENTS

| Re. 28,262 | 12/1974 | Nye . |
| 2,783,386 | 4/1957 | Creelman . |
| 2,932,115 | 4/1960 | Dunn . |
| 3,447,255 | 6/1969 | Walden . |
| 3,808,727 | 5/1974 | Flanders . |
| 3,813,809 | 6/1974 | Frotiee . |
| 3,898,759 | 8/1975 | Jensen . |
| 3,908,299 | 9/1975 | Kalberer . |
| 4,282,672 | 8/1981 | Neary . |

Primary Examiner—Nicholas P. Godici
Assistant Examiner—G. M. Reid
Attorney, Agent, or Firm—Townsend & Townsend

[57] ABSTRACT

A trolling diver includes a planing body with a ballast weight at the front. A mast is pivotally mounted to the center of the body for movement fore and aft between forward and aft positions for climbing and diving. A trip line extends from the front of the body, through a trip line guide on the mast, and to the rod line. The lure is connected by a leader to the body. A spring connects the aft end of the body to a point midway along the mast to bias the mast aft. The spring exerts minimal and substantial reset torques on the mast when in the forward and aft positions by having the spring force act through a short and long torque arms. The torque arm in the forward mast position is preferably adjustable.

17 Claims, 5 Drawing Figures

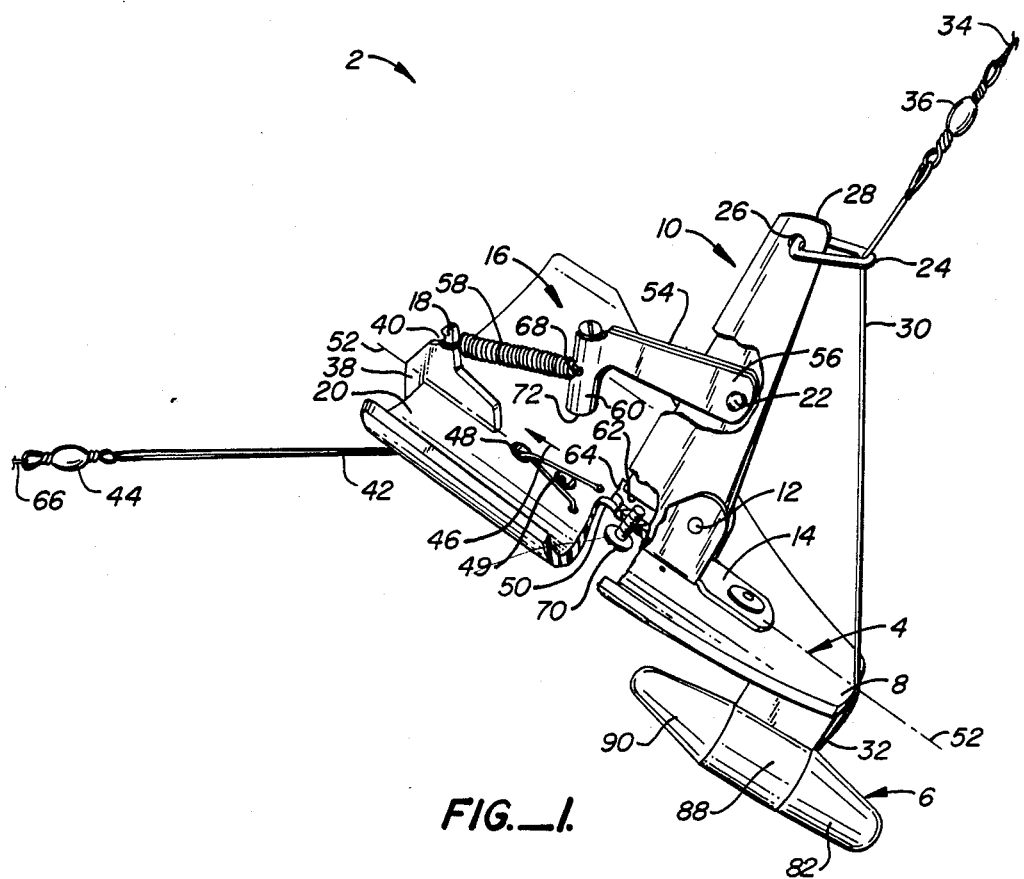
FIG._1.
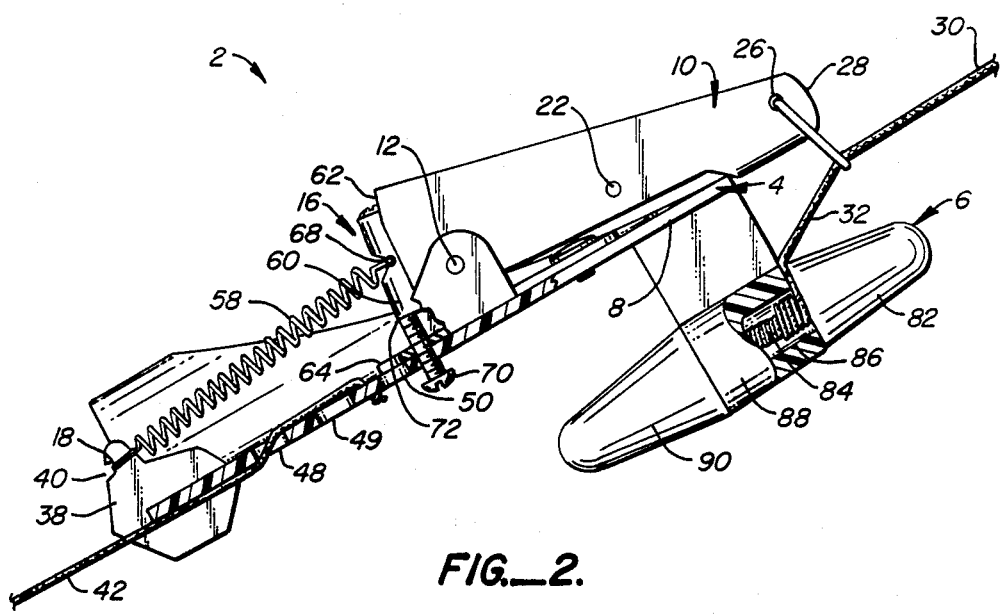
FIG._2.

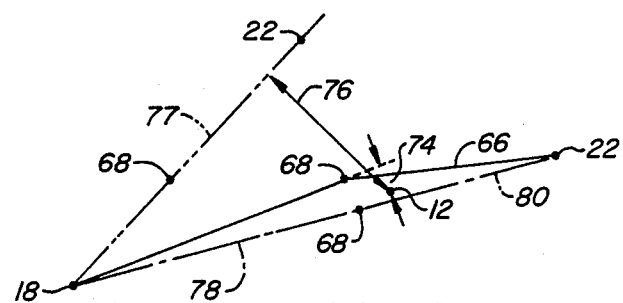
FIG._3.
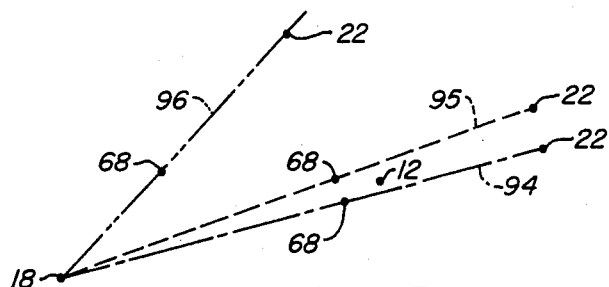
FIG._5.
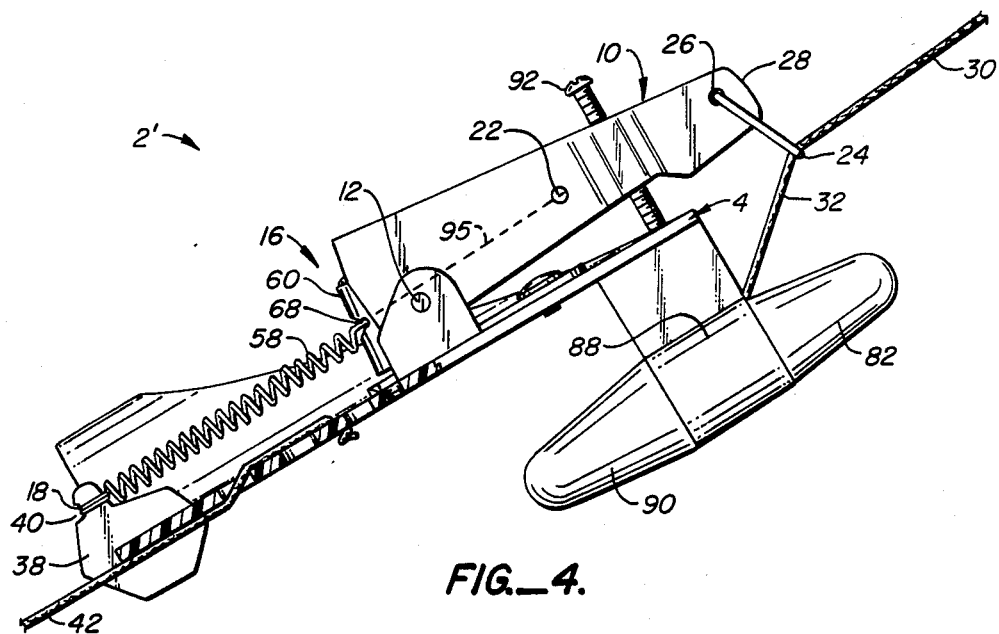
FIG._4.

TROLLING DIVER

BACKGROUND OF THE INVENTION

One popular method of fishing, which is the only practical method for certain species of fish, is trolling. When trolling, one pulls a lure, attached to the rod line, behind a moving boat. One problem with trolling is how to keep the lure at a desired depth. The depth is determined by a number of factors, including the length of line, the trolling speed, the diameter of the line, the weight of the line and the weight, configuration and buoyancy of the lure. Although one could merely use a very heavy lure or heavy weight attached to the line to achieve the proper trolling depth, this would severely hinder playing any fish caught. Thus there have been many different schemes and equipment developed to keep the lure at the required depth and yet retain relatively unrestricted action when playing a fish.

One method of doing so is through the use of a downrigger. Downriggers include a short pole and reel by which a heavy weight is suspended over the side of a boat at the end of the downrigger's line. The rod line is secured to the downrigger line near the weight by a tension release clip. When a fish strikes the lure at the end of the rod line, the increased tension on the rod line causes the tension release clip to open. This releases the fishing line so the fish can be played freely.

Although downriggers can work well, missed strikes or temporary snags require the lure and downrigger weight to be retrieved to reconnect the rod line to the downrigger line. Also, downriggers are somewhat expensive and add an extra level of complexity to fishing. In lieu of downriggers, a heavy weight can be attached between the rod line and the leader connecting the lure by a special clip. When a fish strikes the lure, the leader makes a sudden pull on the clip which releases the weight. The weight drops to the bottom. This, although simple, can be quite expensive.

Instead of downriggers and disposable weights, trolling divers can be used. Divers are placed between the end of the rod line and the leader attached to the lure. Divers all include a planing surface normally disposed at an angle to the horizontal so when they are pulled through the water they drag down or depress the lure. Since doing so creates a large drag on the rod line, they are designed to change from their set or diving attitude to an unset or climbing attitude when a fish strikes the lure. When unset the planing surface becomes aligned with the rod line to substantially reduce the drag and allow the fish to be played freely.

Some divers, once unset, must be retrieved, removed from the water and manually reset by the user. See, for example, U.S. Pat. No. 3,643,370 to Cook and Davis. Other divers, such as shown in U.S. Pat. Nos. 3,808,727 to Flanders, 3,447,255 to Walden and 3,813,809 to Frotiee can be reset by the user while in the water. However, the diver shown in Flanders, Walden and Frotiee patents cannot be unset at will by the user. That is, if it is desired to retrieve the lure rapidly, such as can occur when a fishing partner is playing a fish or when coming near underwater obstructions, the divers remain in their diving attitude thus keeping the lure deeply submerged and making retrieval tedious and tiring.

U.S. Pat. No. 3,898,759 to Jensen discloses a diver which, in theory, can be unset by a fisherman sharply tugging on the rod line. An embodiment similar to the embodiment disclosed in the patent, including the auxiliary fin shown in FIGS. 6 and 7, was marketed for a time as the DOLPHIN. Applicant has found that once unset, the DOLPHIN trolling diver is difficult to keep unset. Only by reeling in the rod line very rapidly, which can be difficult to do for many, will the DOLPHIN remain unset.

The trolling diver sold by BIG JON of Travers City, Mich., covered by U.S. Pat. No. 3,908,299 to Kalberer, provides for the automatic resetting of the diver after a missed strike and permits the user to unset the diver at will by increasing the pull on the rod line. However, in distinction to the DOLPHIN diver, the BIG JON diver remains unset at only moderate speeds of line retrieval. Although the BIG JON trolling diver does fulfill all the desirable objectives for a user controlled diver, it does have a minor shortcoming. Sometimes its lines get tangled, which usually requires the user to retrieve it and manually untangle the line.

SUMMARY OF THE INVENTION

The present invention provides a completely user controllable trolling device which is simple in construction, easy to use and is not prone to fouling during use.

The trolling diver of the invention includes a generally planar body member to which a ballast weight is mounted at the fore end. A mast is pivotally mounted to the center of the upper surface of the body for movement fore and aft between a first, generally upright position and a second pivotally forward position generally parallel to the body. A spring assembly is connected to a first connection point at the aft end of the body and a second connection point midway along the mast. The spring assembly biases the mast toward the first, upright position.

A trip line guide is mounted to the upper end of the mast. A trip line extends from the fore end of the body, through the trip line guide and to a trip line swivel for connection to the rod line, the rod line extending to the user's rod on the boat. The lure is connected to a leader line extending rearwardly from the body typically from a position aft of the mast.

When the mast is in the first, upright position, the diver is in the set or diving attitude with the body at an angle to the horizontal. In this position, the diver pulls the rod line downwardly. The diver is transformed to the unset or climbing attitude, during which the mast is in the second position, in one of several ways. Preferably this occurs when a fish strikes the lure thus causing a sufficient tension on the trip line to pull the mast forward. The diver can also be unset if it hits a snag or by the user pulling harder on the rod line.

Much less force is required to keep the mast in its second position than it takes to initially move the mast from its first position. This is accomplished by positioning the mast pivot point and the first and second connecting points to be approximately collinear when the mast is in its second position. In this way the restoring torque exerted by the spring assembly on the mast in the second mast position is relatively small because the lever arm is small. Thus the user need keep only a moderate tension on the rod line to maintain the diver in the unset, low water resistance attitude. However, the user can reset the diver by merely allowing the rod line to go slack which allows the mast to snap back to its first, upright position and thus return the diver to its set or diving attitude. Thus, the user has total control over the attitude of the diver without needing to remove the diver from the water.

In a preferred embodiment the direction of the force exerted by the spring assembly on the mast relative to the mast pivot point, when the mast is in the second, forward position, is adjustable by the user. This can be accomplished by leaving the mast stationary and deflecting the spring assembly; this can also be done by adjusting the second, forward position of the mast.

The user adjustable feature of the invention is quite important for several reasons. First, standard manufacturing tolerances can be accommodated in this manner. Second, the user can tailor the torque applied to the mast when the mast is in the second, forward position according to the operating conditions. Also, changes in spring strength or frictional characteristics at the various pivot joints can be compensated for.

Other features and the advantages will appear from the following description in which the preferred embodiments have been set forth in detail in conjunction with the accompanying drawings.

BRIEF DESCRIPTION OF THE DRAWINGS

FIG. 1 is a perspective view of a trolling diver made according to the invention in the set or diving attitude.

FIG. 2 is a side view of the diver of FIG. 1 shown in the unset or climbing attitude.

FIG. 3 diagrammatically shows the positions of the mast pivot point and first, second and third connection points for the diver of FIG. 1.

FIG. 4 is a view similar to FIG. 2 of an alternative embodiment of the trolling diver of FIG. 1.

FIG. 5 diagrammatically shows the position of the mast pivot point and the first and second connection points of the embodiment of FIG. 4.

DETAILED DESCRIPTION OF THE PREFERRED EMBODIMENTS

Turning now to FIGS. 1 and 2, a trolling diver 2 is seen to include broadly a generally triangular body 4, a ballast weight assembly 6 mounted to the fore end 8 of body 4 and a mast 10 mounted centrally to body 4, for pivotal movement fore and aft about a mast pivot point 12, by a mounting bracket 14. A reset spring assembly 16 connects a first connection point 18 at the aft end 20 of body 4 with a second connection point 22 positioned medially along mast 10.

Mast 10 has a trip line guide 24 made of a triangular metal ring or loop mounted through an opening 26 at the upper or distal end 28 of mast 10. A trip line 30 is connected at its one end 32 to ballast weight assembly 6, passes through guide 24 and is connected to a rod line 34 by a trip line swivel 36. Rod line 34 extends to the user's rod in the fishing boat, not shown.

Body 4 includes a generally vertical stabilizing fin 38 having an opening 40 near its upper end defining first connection point 18. A leader line 42, in the form of a loop with a leader line swivel 44 connected to line 42, is mounted to body 4 aft, that is in the direction of an arrow 46, of mast pivot point 12. Both strands of line 42 pass through one of several openings 48, 49, 50 formed through body 4 along the fore to aft centerline 52 of diver 2. Typically leader line 42 and swivel 44 are inserted upwardly through opening 48 adjacent aft end 20 for small lures and small fish. For larger fish swivel 44 and line 42 are inserted downwardly through the opening 48. This is the configuration shown in FIGS. 1 and 2. Leader line 42 and swivel 44 are inserted downwardly through openings 49 or 50 as the fish and lures get progressively larger.

Reset spring assembly 16 includes a generally L-shaped reset rod 54, one end 56 pivotally connected to mast 10 at second connection point 22, and a reset spring 58 connected between first connection point 18 and head end 60 of reset rod 54 at a third connection point 68.

Aft pivotal movement of mast 10 is halted by the engagement of the lower edges 62 of mast 10 with portions 64 of base plate 14. Spring assembly 16 acts to keep mast 10 in its aft, generally vertically upright position of FIG. 1. When sufficient tension is exerted on trip line 30, mast 10 pivots forward, that is parallel to centerline 52, to its second position of FIG. 2. This commonly occurs when the lure, not shown, connected to swivel 44 by a leader 66, is taken by a fish. A fish, upon taking the lure, not only increases the tension on trip line 30 but also tends to depress aft end 20 of body 4 to further aid the forward pivotal movement of mast 30. Mast 10 can also be made to pivot forward by the user pulling harder on the rod line, typically by swinging the tip of the fishing pole forward, which cause an increase in tension on trip line 30.

Turning now to FIG. 3, an imaginary line 66 is shown connecting second connection point 22 with third connection point 68. Line 66 thus lies above, using body 4 as a reference, mast pivot point 12 by a lever arm distance 74. This being the case, spring 58 continues to apply a small torque to mast 10 tending to pivot mast 10 from its second position of FIG. 2 to its first position of FIG. 1.

An adjustment screw 70 is mounted through a threaded hole in mounting bracket 14 in a position to contact the lower end 72 of head 60. By rotating screw 70, the position of the lower end 72 relative to pivot point 12 can be adjusted thus varying lever arm distance 74. FIG. 3 also illustrates, using a double dashed cutting plane lines 77, the relative positions of these points when mast 10 is in the upright position of FIG. 1 indicating the much larger lever arm 76. This graphically illustrates the change in the aft pivoting torque exerted by spring assembly 16 on mast 10 between the second, forward position of FIG. 2 and the first, upright or aft position of FIG. 1.

FIG. 3 also illustrates, with single dashed centerlines 78, 80, the change in the position of third connecting point 68 when diver 2 is the unset or climbing attitude of FIG. 2 but with adjustment screw 70 backed off. This allows lower end 72 to move toward body 4 so that imaginary line 80 connecting third connection point 68 with second connection point 22 is below mast pivot point 12. In this position, which is not generally used, the force of spring 58 would tend to pivot mast 10 towards body 4 and ballast weight assembly 6. At such an adjustment diver 2 would no longer be automatically resetting nor remotely resettable by the user.

Although screw 70 could be omitted and head 60 configured to keep third connection point 68, when mast 10 is in its forward position of FIG. 2, above mast pivot point 12, it is desired to be able to vary this for several reasons. First, manufacturing tolerances can be relaxed since each diver 2 can be quickly and easily initially set for a proper, nominal pivotal torque with mast 10 in the forward direction. However, depending on the circumstances surrounding the use of diver 2, the user can easily and quickly adjust the torque on mast 10 when mast 10 is in the second, forward position of FIG.

2. This can be especially useful when corrosion and wear affect the operation of various parts. It also may be useful to adjust screw 70 to account for the different amounts of drag exerted by different lures, different trolling speeds and different size fish.

Ballast weight assembly 6 is similar to that used with the BIG JON diver sold by Big Jon of Traverse City, Mich. Ballast weight assembly 6 includes a lead nose 82 having a threaded stud 84 extending aft through an enlarged cylindrical opening 86 in a ballast weight support 88 mounted to and extending downwardly from fore end 8 of body 4. One end 32 of trip line 30 is connected to stud 84. Stud 84 is much smaller than cylindrical opening 86 so that trip line 30 can be wound onto or unwound from stud 84. A nut 90 is threadly mounted to stud 84 and is used to secure lead nose 82 and threaded stud 84 in place against support 88. This arrangement allows the user to wind up trip line 30 as it becomes worn through use to reduce the possibility of fraying and premature breaking of trip line 30.

In use, the user adjusts screw 70 of diver 2 so that when mast 10 is in the forward position of FIG. 2, only a slight force is needed to keep it in position. The user then drops diver 2, with a lure attached to swivel 44, overboard and lets out 15 or 20 feet of rod line giving it a bit of slack. Diver 2 should now be in the set or diving position of FIG. 1 and therefore pulling hard. The depth at which diver 2 will go to depends on several parameters, including the amount of rod line 34 let out, the line weight and thickness, trolling speed, and the weight and shape of the lure. If it is desired to decrease the depth of diver 2, the user exerts an increased force on diver 2, typically by swinging the fishing rod forward. This causes an increased force to be exerted on trip line 30 thus pivoting mast 10 forward to its second position of FIG. 2. An amount of rod line 34 sufficient to achieve the new desired depth is steadily retrieved. Thereafter rod line 34 is momentarily to slackened. This reduces the tension on trip line 30 and allows ballast weight assembly 6 to nose diver 2 downwardly while mast 10 pivots aft. Since the force exerted by spring 58 on mast 10 steadily increases from the second, forward position to the first, upright or aft position, mast 10 actually snaps back when resetting to the set or diving attitude of FIG. 1. The sudden change in the attitude of diver 2 from climbing to diving is quite noticeable to the user and indicates proper operation of diver 2.

Once a fish strikes, an increased force is exerted on swivel 44 thus increasing the force on trip line 30. If the force is sufficiently great, mast 10 pivots forward from the first position of FIG. 1 to the second position of FIG. 2. This position is maintained while playing the fish. Since trolling diver 2 is in the unset or climbing attitude of FIG. 2 it provides relatively little resistance while being pulled through the water. If the fish is lost, the user can reset trolling diver 2 by slacking rod line 34 temporarily.

Turning now to FIG. 4, an alternative embodiment of diver 2 is shown. Diver 2' is similar to diver 2 of FIG. 1, but uses an adjustment screw 92 mounted along mast 10 to vary the second, forward position of mast 10. When adjustment screw 92 is fully retracted mast 10 lies against body 4. In this position, an imaginary line 94, shown in FIG. 5, connecting first and second connection points 18, 22 lies below mast pivot point 12. Therefore in this position spring assembly 16 tends to pivot mast 10 toward body 4 so diver 2' is not automatically resettable. As one extends screw 92, the position of second connection point 22 changes thus raising imaginary line 94 to where it passes above pivot point 12. Dashed line 95, shown in FIGS. 4 and 5, shows the position of connection point 22 during use, during which spring assembly 16 biases mast 10 aft and away from base 4. Trolling diver 2 of FIG. 4 is used at this adjustment since it provides for automatic resetting of the diver as well as user controlled setting, unsetting and resetting. The double dashed line 96 corresponds to line 77 of FIG. 3.

Modification and variation can be made to the disclosed embodiments without departing from the subject invention as defined in the following claims.

I claim:

1. A user controllable trolling diver for use between a rod line and a leader, comprising:
   a body member;
   a ballast weight mounted to a fore end of the body member;
   a mast pivotally mounted to the body member at a mast pivot point for pivotal movement fore and aft from a first, aft position to a second, forward position generally parallel to the body;
   a trip line guide mounted to the mast;
   a trip line extending between the fore end of the body member and the rod line and passing through the trip line guide;
   spring means, connecting a first connection point towards an aft end of the body member and a second connection point along the mast, for exerting a reset force on the mast at the first connection point to bias the mast aft and towards the first position, the spring means including a spring and a reset rod connected in series to each other at a third connection point between the first and second connection points; and
   the reset force acting in a reset direction when the mast is in the second position, the reset direction being offset from the mast pivot point by a small amount so the length of a torque arm between the reset direction and the mast pivot point is relatively short so the reset torque on the mast in the second position is minimal to allow the user to keep the mast in the second position with only moderate reeling in effort while permitting the user to reset the diver by slacking the rod line resulting in the mast snapping back to the first position.

2. The diver of claim 1 wherein the first connection point is at the aft end of the body member.

3. The diver of claim 1 wherein one end of the trip line is connected to the body member.

4. The diver of claim 1 wherein the trip line guide is mounted to a distal end of the mast.

5. The diver of claim 1 wherein the body member is a generally triangular shaped planar member.

6. The diver of claim 1 further comprising a trip line reel mounted at the fore end of the body member for paying out and retrieving the trip line.

7. The diver of claim 1 wherein the first connection point is positioned above an upper surface of the body member.

8. The diver of claim 1 wherein the second connection point is positioned between the pivot point and the trip line guide.

9. The diver of claim 8 wherein the second connection point is positioned medially between the pivot point and the trip line guide.

10. The diver of claim 1 wherein the reset rod is pivotally connected to the second connection point.

11. The diver of claim 1 further comprising means for adjusting the height of the third connection point above the body member.

12. The diver of claim 1 further comprising means for varying the angle of the reset direction relative to the body and the pivot point when the mast is in the second position to vary the torque arm length.

13. The diver of claim 12 wherein the angle of force varying means includes means for adjusting the second mast position.

14. The diver of claim 13 wherein the adjusting means adjusts the angular orientation of the mast in the second position relative to the body member.

15. A trolling diver for use between the leader and the rod line, comprising:
   a planing body member having front and rear ends, a front to rear axis and a top surface;
   a weight mounted to the front end of the body member;
   a mast, having upper and lower ends, the lower end pivotally mounted to the top surface of the body member at a first pivot point to pivot along a path generally parallel to the front to rear axis between a first, aft, generally upright diving position and a second, forward, fish playing, low resistance position generally parallel to said body member;
   a trip line guide at the upper mast end;
   a trip line secured to one end to the front body member end and slidingly passing through the trip line guide for connection to the rod line;
   means for connecting the leader to the body member;
   a reset spring connected between the body member at a first connection point towards the rear of the body member and the mast at a second connection point, the first and second connection points positioned so a first, substantial reset torque, tending to pivot the mast toward the first position, is exerted on the mast by the reset spring when the mast is in the first position and a second, minimal reset torque is exerted on the mast by the reset spring when the mast is in the second position; and
   a reset rod pivotally connected between the mast at the second connection point along the mast and the spring at a third connection point at a head end of the reset rod;
   whereby the mast remains in the first position until a first force is exerted on the mast by the trip line to overcome the first reset torque whereupon the mast pivots to the second position generally parallel to the body member to provide low drag, the mast maintainable in the second position by exertion of a second force on the mast by the trip line sufficient to overcome the second reset torque, the mast being returnable to the first orientation by the user slacking rod line.

16. The trolling diver of claim 15 further comprising means for adjusting the position of the third connecting point relative to the body member when the mast is in the second orientation so to change the second, minimal reset torque.

17. The trolling diver of claim 15 further comprising means for adjusting the second mast orientation so to vary the position of the second connection point relative to the body member so to change the second, minimal reset torque.

* * * * *